US008488634B2

(12) United States Patent
Novak et al.

(10) Patent No.: US 8,488,634 B2
(45) Date of Patent: Jul. 16, 2013

(54) USE OF FIRST AND SECOND PREAMBLES IN WIRELESS COMMUNICATION SIGNALS

(75) Inventors: Robert Novak, Ottawa (CA); Mo-Han Fong, Ottawa (CA)

(73) Assignee: Apple Inc., Cupertino, CA (US)

( * ) Notice: Subject to any disclaimer, the term of this patent is extended or adjusted under 35 U.S.C. 154(b) by 292 days.

(21) Appl. No.: 12/830,976

(22) Filed: Jul. 6, 2010

(65) Prior Publication Data

US 2011/0075748 A1 Mar. 31, 2011

Related U.S. Application Data

(63) Continuation-in-part of application No. 12/806,180, filed on Jul. 3, 2009, now abandoned.

(60) Provisional application No. 61/222,976, filed on Jul. 3, 2009, provisional application No. 61/078,544, filed on Jul. 7, 2008.

(51) Int. Cl.
*H04L 12/56* (2006.01)
*H04L 1/16* (2006.01)

(52) U.S. Cl.
USPC ............ 370/509; 370/252; 370/329; 370/430

(58) Field of Classification Search
USPC .................................. 370/252, 329, 430, 509
See application file for complete search history.

(56) References Cited

U.S. PATENT DOCUMENTS

| | | | |
|---|---|---|---|
| 7,194,055 B2* | 3/2007 | Tandai et al. | 375/368 |
| 7,675,841 B2* | 3/2010 | Suh et al. | 370/203 |
| 8,169,997 B2* | 5/2012 | Machida | 370/350 |
| 2006/0062196 A1* | 3/2006 | Cai et al. | 370/345 |
| 2007/0230590 A1 | 10/2007 | Choi et al. | |
| 2007/0274408 A1 | 11/2007 | Ma et al. | |
| 2008/0039107 A1* | 2/2008 | Ma et al. | 455/450 |
| 2008/0095195 A1* | 4/2008 | Ahmadi et al. | 370/478 |
| 2008/0107200 A1* | 5/2008 | Zhu et al. | 375/260 |
| 2009/0067517 A1 | 3/2009 | Hung et al. | |
| 2009/0135761 A1* | 5/2009 | Khandekar et al. | 370/328 |
| 2009/0156214 A1 | 6/2009 | Lee et al. | |
| 2010/0246475 A1 | 9/2010 | Naden et al. | |
| 2012/0044829 A1* | 2/2012 | Piggin et al. | 370/252 |

FOREIGN PATENT DOCUMENTS

WO PCT/CA2010/001032 11/2010

OTHER PUBLICATIONS

Suh, Changho et al., IEEE 802.16 Broadband Wireless Access Working Group, "STC (Space-Time Code) Preamble Sequence in OFDM system", Jan. 9, 2003, 4 pages.

Eklund, Carl et al., IEEE 802.16 Broadband Wireless Access Working Group, "IEEE Standard 802.16: A technical Overview of the Wireless MANTM Air interface for Broadband Wireless Access", IEEE Communications Magazine, dated Jun. 4, 2002, 12 pages.

(Continued)

*Primary Examiner* — John Pezzlo
(74) *Attorney, Agent, or Firm* — Meyertons, Hood, Kivlin, Kowert & Goetzel, P.C.

(57) ABSTRACT

A method and system for a method of transmitting data within a signal frame. The method comprises inserting a first synchronization preamble into a first location within the signal frame and inserting a second synchronization preamble into a second location within the signal frame, wherein the first synchronization preamble conveys information indicative of the second location. The method further comprises issuing the signal frame towards a receiving device in a wireless communication environment.

31 Claims, 16 Drawing Sheets

OTHER PUBLICATIONS

IEEE 802.16m-08/003r9a, dated May 31, 2009, pp. 90-96.
Rahmes, Ken, "UL PUSC SOFDMA Calculations. What every wireless broadband engineer should know", copyright 2008, 5 pages.
Parekh, Shyam, 802.16/WiMAX "EECS 228a", Spring 2006, 37 pages.
Office Action mailed on Nov. 14, 2011 in connection with U.S. Appl. No. 12/806,180, 9 pages.

* cited by examiner

USE OF FIRST AND SECOND PREAMBLES IN WIRELESS COMMUNICATION SIGNALS

CROSS REFERENCE TO RELATED APPLICATIONS

This application is a continuation-in-part of non-provisional U.S. patent application Ser. No. 12/806,180 filed Jul. 3, 2009 now abandoned resulting from the conversion under 37 C.F.R. §1.53(c)(3) of U.S. provisional patent application No. 61/222,976 filed on Jul. 3, 2009, and which itself claims the benefit under §119(e) of U.S. provisional patent application No. 61/078,544 filed on Jul. 7, 2008. The contents of the above-mentioned patent applications in their entirety are incorporated herein by reference.

FIELD OF THE INVENTION

The present invention relates generally to the field of data delivery via a wireless connection and, more particularly, to the delivery of data via signal frames that comprise multiple synchronization preambles.

BACKGROUND OF THE INVENTION

The demand for services in which data is delivered via a wireless connection has grown in recent years and is expected to continue to grow. Included are applications in which data is delivered via cellular mobile telephony or other mobile telephony, personal communications systems (PCS) and digital or high definition television (HDTV). Though the demand for these services is growing, the channel bandwidth over which the data may be delivered is limited. Therefore, it is desirable to deliver data at high speeds over this limited bandwidth in an efficient, as well as cost effective, manner.

A known approach for efficiently delivering high speed data over a channel is by using Orthogonal Frequency Division Multiplexing (OFDM). The high-speed data signals are divided into tens or hundreds of lower speed signals that are transmitted in parallel over respective frequencies within a radio frequency (RF) signal that are known as sub-carrier frequencies ("sub-carriers"). The frequency spectra of the sub-carriers overlap so that the spacing between them is minimized. The sub-carriers are also orthogonal to each other so that they are statistically independent and do not create crosstalk or otherwise interfere with each other. As a result, the channel bandwidth is used much more efficiently than in conventional single carrier transmission schemes such as AM/FM (amplitude or frequency modulation).

Another approach to providing more efficient use of the channel bandwidth is to transmit the data using a base station having multiple antennas and then receive the transmitted data using a remote station having multiple receiving antennas, referred to as Multiple Input-Multiple Output (MIMO). The data may be transmitted such that there is spatial diversity between the signals transmitted by the respective antennas, thereby increasing the data capacity by increasing the number of antennas. Alternatively, the data is transmitted such that there is temporal diversity between the signals transmitted by the respective antennas, thereby reducing signal fading.

In OFDM and MIMO systems, a preamble may be inserted within a signal frame in order to provide: base station identification and selection, CIR measurement, framing and timing synchronization, frequency synchronization as well as channel estimation. In many cases, the preamble search requires a large amount of computation power at the subscriber station. For the initial cell search, there is no prior knowledge about the synchronization positions for potential base station candidates; hence the subscriber station needs to perform the correlations with all possible pseudo noise (PN) sequences for each Fourier fast transform window position within the entire searching window. Such a window could be large even for the synchronous bases station network. For handoff, even with the presence of the adjacent base station list information broadcast from the anchoring base station, the preamble search is of excessively high computational complexity.

Advancements to communication systems such as those standardized in the evolution of WiMAX have resulted in concepts that build upon the initial frame structure found in the original 802.16e standard. These concepts result in new possibilities for addressing and synchronizing devices within the communication system. These concepts and possibilities also may be applied to any 3GPP or 3GPP2 system.

It is therefore desirable to provide preambles that enable easy, fast synchronization between the subscriber station and the base stations and that provide low complexity and fast cell search after coarse synchronization.

Accordingly, there is a need for an improved preamble design, method and apparatus which are suitable for the mobile, broadband wireless access systems.

SUMMARY OF THE INVENTION

In accordance with a first broad aspect, the present invention provides a method of transmitting data within a signal frame. The method comprises inserting a first synchronization preamble into a first location within the signal frame and inserting a second synchronization preamble into a second location within the signal frame, wherein the first synchronization preamble conveys information indicative of the second location. The method further comprises issuing the signal frame towards a receiving device in a wireless communication environment.

In accordance with a second broad aspect, the present invention provides a method for generating a signal frame. The method comprises determining a first location within the signal frame for inserting a first synchronization preamble and a second location within the signal frame for inserting a second synchronization preamble, generating the first synchronization preamble at least in part on a basis of the determined second location of the second synchronization preamble, inserting the first synchronization preamble at the determined first location within the signal frame, inserting the second synchronization preamble at the determined second location within the signal frame and causing the signal frame to be issued towards a receiving device in a wireless communication environment.

In accordance with a third broad aspect, the present invention provides a transmitting device for transmitting a signal frame over a wireless communication environment. The transmitting device comprises a control entity operative for determining a first location within the signal frame for a first synchronization preamble and a second location within the signal frame for a second synchronization preamble, generating the first synchronization preamble at least in part on a basis of the determined second location of the second synchronization preamble, inserting the first synchronization preamble at the determined first location within the signal frame and inserting the second synchronization preamble at the determined second location within the signal frame. The transmitting device further comprises transmitting circuitry for causing the signal frame to be issued towards a receiving device.

In accordance with a fourth broad aspect, the present invention provides a method of receiving a signal frame in a wireless communication environment. The method comprises receiving a wireless signal comprising a plurality of signal frames, wherein each signal frame comprises a first synchronization preamble and a second synchronization preamble, identifying a first synchronization preamble within a given signal frame, determining at least in part on a basis of information conveyed by the first synchronization preamble a location within the given signal frame of the second synchronization preamble and obtaining from a combination of the first synchronization preamble and the second synchronization preamble transmission signalling information.

In accordance with a fifth broad aspect, the present invention provides a receiving device for receiving a signal frame in a wireless communication environment. The receiving device comprises receiving circuitry and a control entity. The receiving circuitry is for receiving a wireless signal comprising a plurality of signal frames, wherein each signal frame comprises a first synchronization preamble and a second synchronization preamble. The control entity is for identifying a first synchronization preamble within a given signal frame of the wireless signal, determining at least in part on a basis of information conveyed by the first synchronization preamble a location within the given signal frame of the second synchronization preamble and obtaining from a combination of the first synchronization preamble and the second synchronization preamble transmission signalling information.

These and other aspects and features of the present invention will now become apparent to those of ordinary skill in the art upon review of the following description of specific embodiments of the invention and the accompanying drawings.

Other aspects and features of the present invention will become apparent to those ordinarily skilled in the art upon review of the following description of specific embodiments of the invention in conjunction with the accompanying figures.

DETAILED DESCRIPTION

Figure 1:
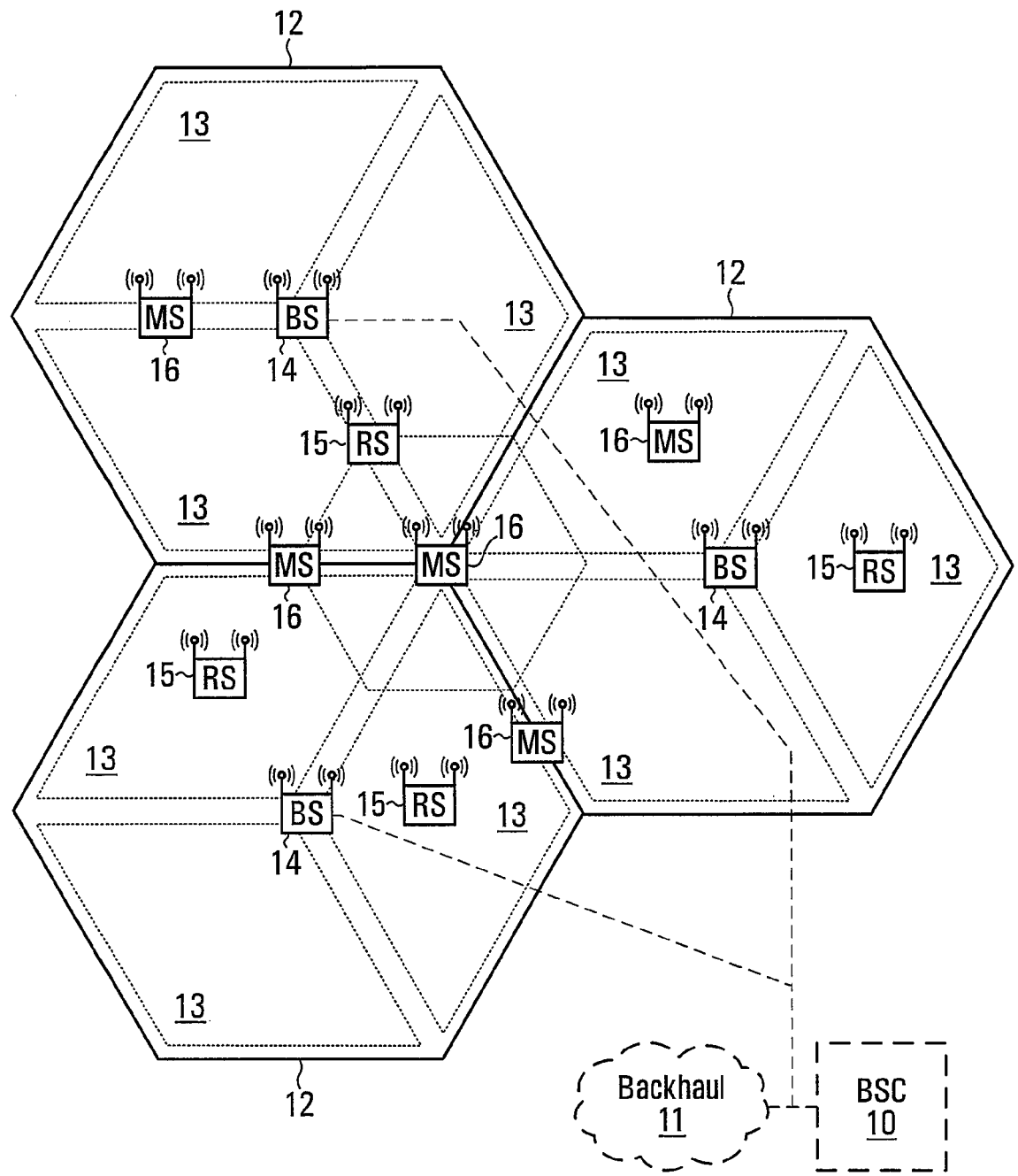
FIG. 1 shows a block representation of a wireless communication system.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals (MS) 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless mobile terminals 16 can be handed off 18 from any cell 12, sector 13, zone (not shown), base station 14 or relay station (RS) 15 to another cell 12, sector 13, zone (not shown), base station 14 or relay station 15. In some configurations, base stations 14 communicate with each other and with another network (such as a core network or the internet, both not shown) over a backhaul network 11. In some configurations, a base station controller 10 is not needed.

Figure 2:
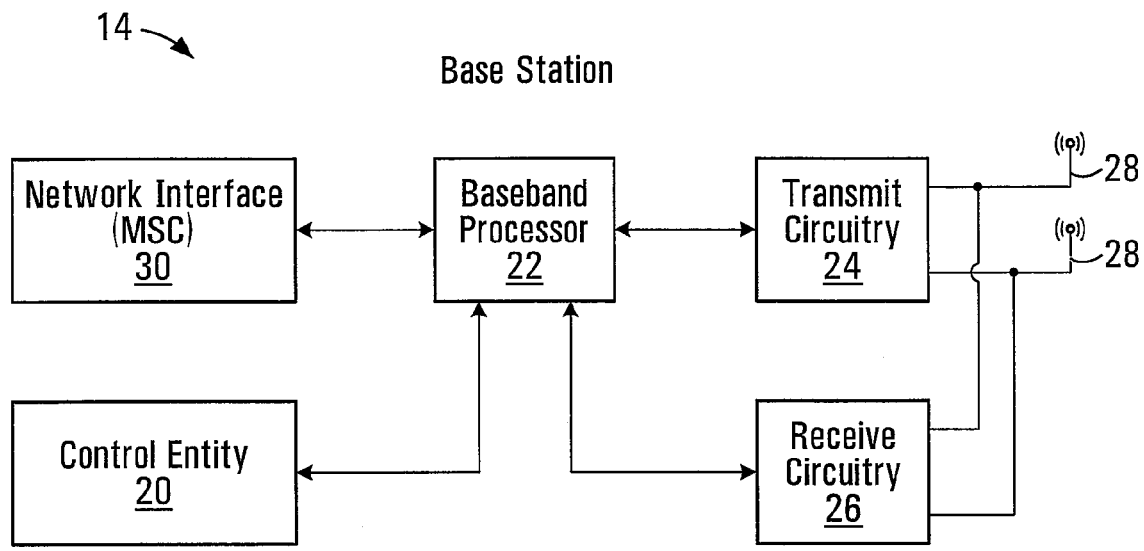
FIG. 2 shows a block representation of a base station according to a non-limiting embodiment of the present invention.

With reference to FIG. 2, an example of a base station 14 is illustrated. The base station 14 generally includes a control entity 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control entity 20, and encodes the data for transmission, The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
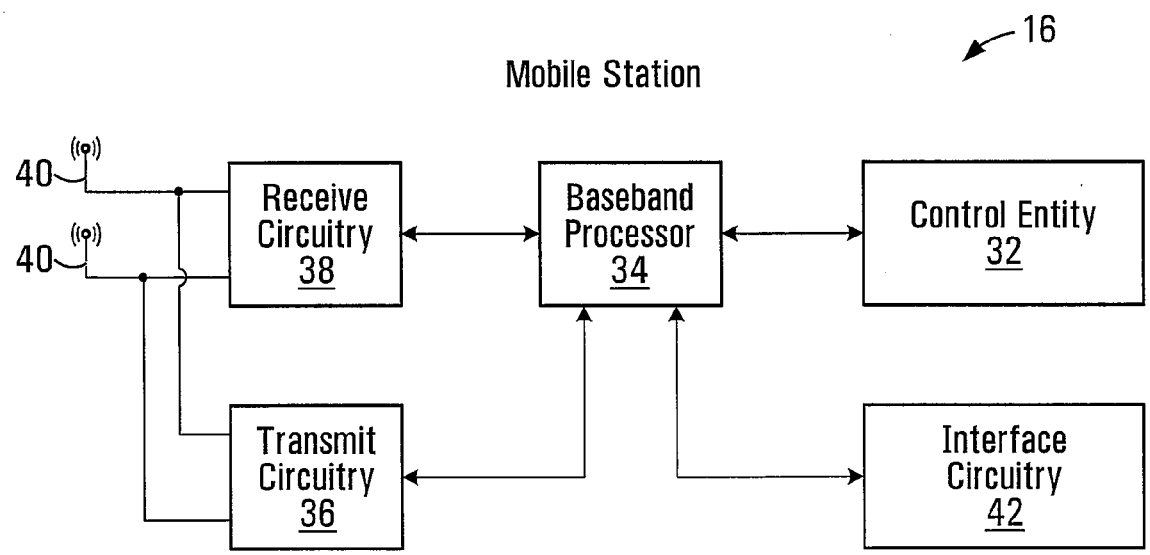
FIG. 3 shows a block representation of a mobile station according to a non-limiting embodiment of the present invention.

With reference to FIG. 3, an example of a mobile terminal 16 is illustrated. Similarly to the base station 14, the mobile terminal 16 will include a control entity 32, a baseband processor 34, transmit circuitry 36, receive circuitry 38, multiple antennas 40, and-user interface circuitry 42. The receive circuitry 38 receives radio frequency signals bearing information from one or more wireless transmitters, which could be base stations 14 and/or relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control entity 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station 15.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when as single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1).

Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
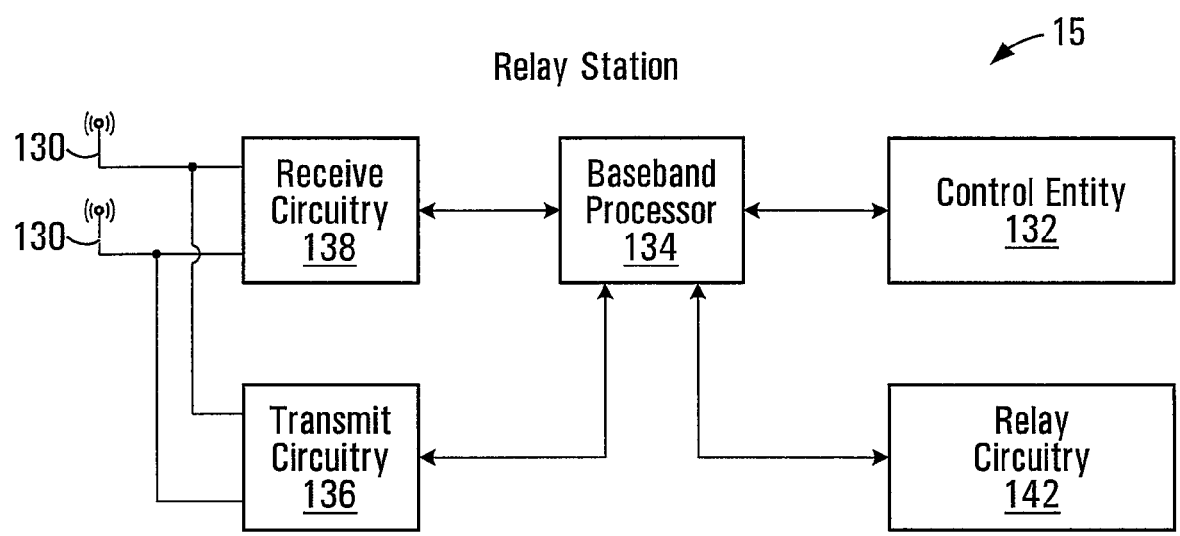
FIG. 4 shows a block representation of a relay station according to a non-limiting embodiment of the present invention.

With reference to FIG. 4, an example of a relay station 15 is illustrated. Similarly to the 25 base station 14, and the mobile terminal 16, the relay station 15 will include a control entity 132, a baseband processor 134, transmit circuitry 136, receive circuitry 138, multiple antennas 130, and relay circuitry 142. The relay circuitry 142 enables the relay 15 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control entity 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station 15, as described above.

Figure 5:
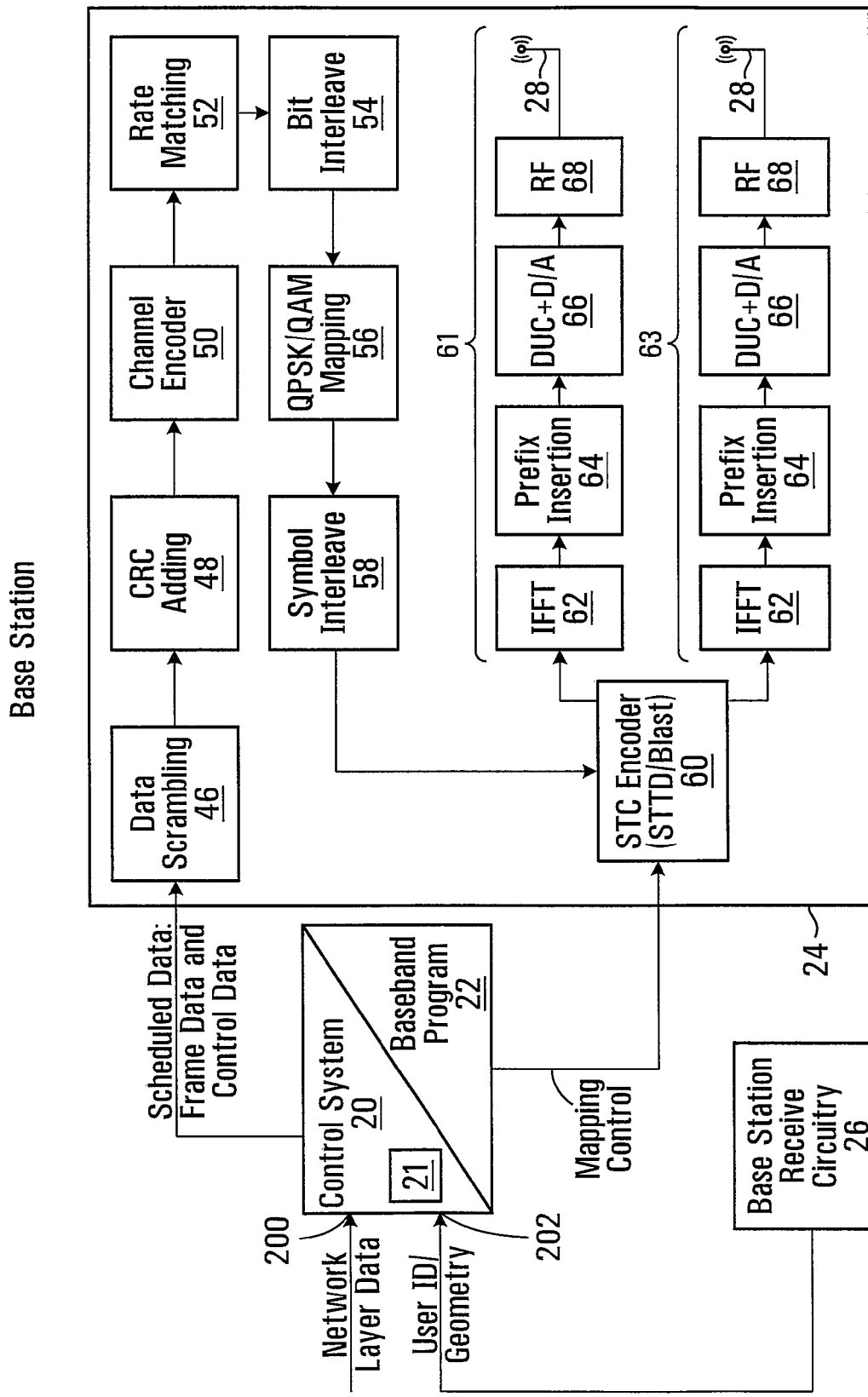
FIG. 5 shows a logical breakdown of a transmitter architecture according to a non-limiting embodiment of the present invention.

With reference to FIG. 5, a logical OFDM transmission architecture will be described. Initially, the base station controller 10 will send data to be transmitted to various mobile terminals 16 to the transmitting devices, which could be the base station 14 directly or the base station 14 with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
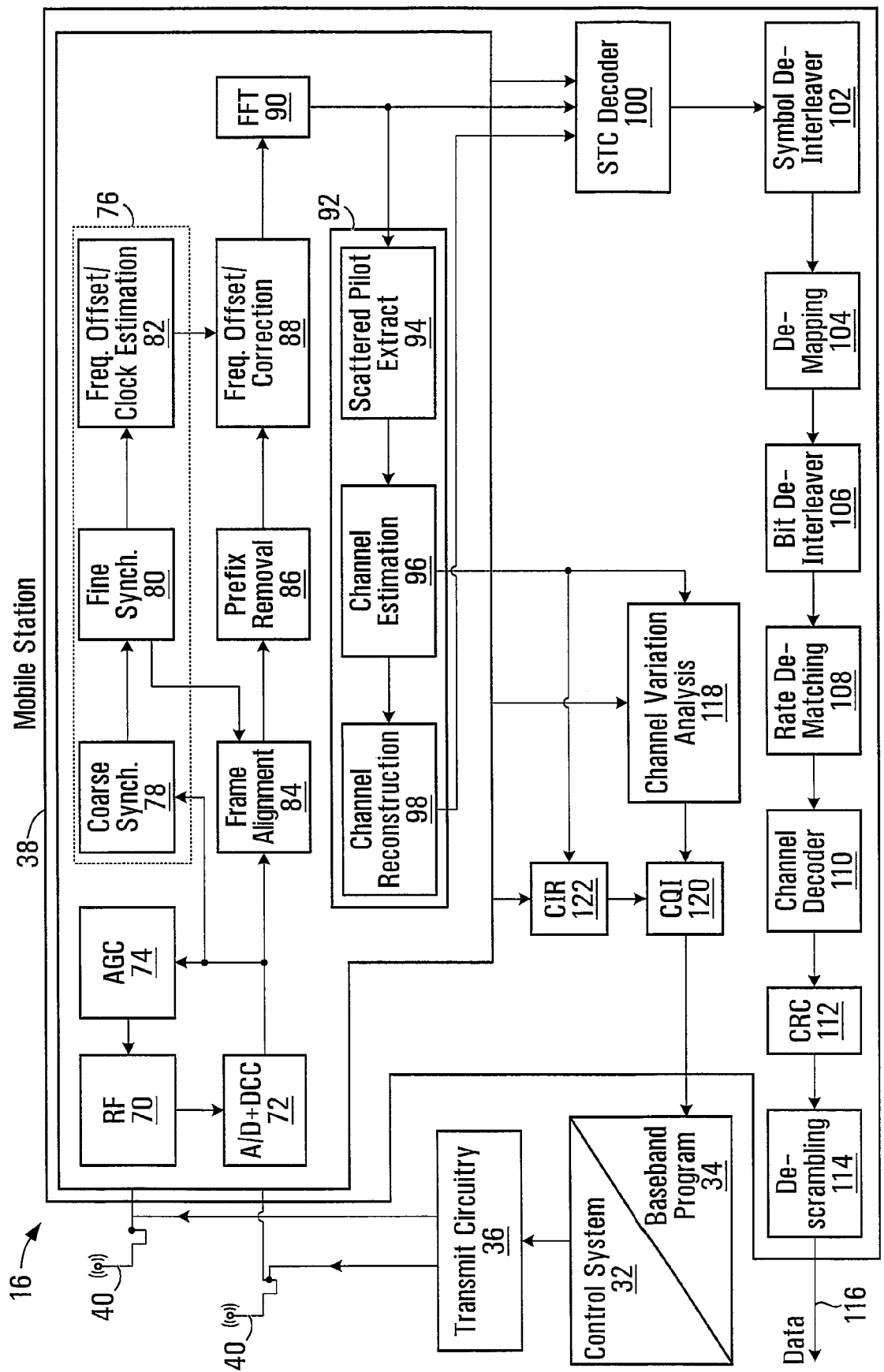
FIG. 6 shows a logical breakdown of a receiver architecture according to a non-limiting embodiment of the present invention.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments, a relay station may operate in a time division manner using only one radio, or alternatively include multiple radios.

FIGS. 1 to 6 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Figure 7:
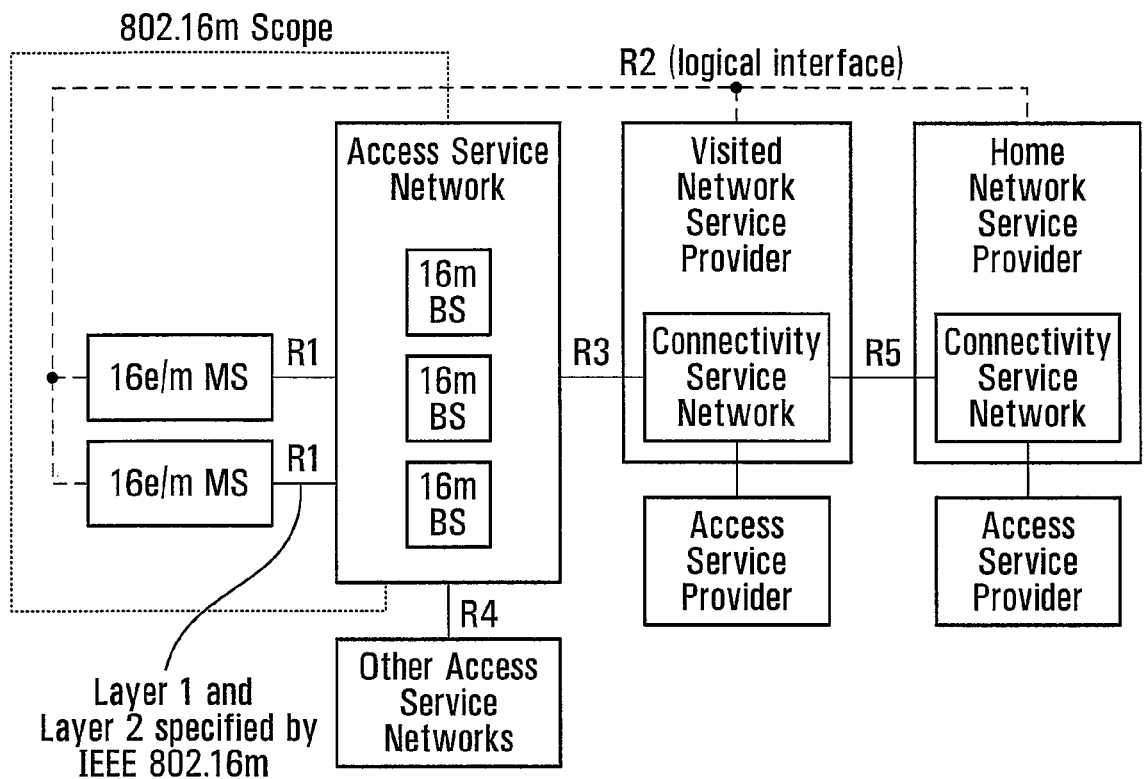
FIG. 7 shows FIG. 1 of IEEE 802.16m-08/003r1, an example of an overall network architecture.

Turning now to FIG. 7, there is shown an example network reference model, which is a logical representation of a network that supports wireless communications among the aforementioned BSs 14, MSs 16 and RSs 15, in accordance with a non-limiting embodiment of the present invention. The network reference model identifies functional entities and reference points over which interoperability is achieved between these functional entities. Specifically, the network reference model can include a MS 16, an Access Service Network (ASN), and a Connectivity Service Network (CSN).

The ASN can be defined as a complete set of network functions needed to provide radio access to a subscriber (e.g., an IEEE 802.16e/m subscriber). The ASN can comprise network elements such as one or more BSs 14, and one or more ASN gateways. An ASN may be shared by more than one CSN. The ASN can provide the following functions:

Layer-1 and Layer-2 connectivity with the MS 16;
Transfer of AAA messages to subscriber's Home Network Service Provider (H-NSP) for authentication, authorization and session accounting for subscriber sessions
Network discovery and selection of the subscriber's preferred NSP;
Relay functionality for establishing Layer-3 (L3) connectivity with the MS 16 (e.g., IP address allocation);
Radio resource management.

In addition to the above functions, for a portable and mobile environment, an ASN can further support the following functions:
ASN anchored mobility;
CSN anchored mobility;
Paging;
ASN-CSN tunnelling.

For its part, the CSN can be defined as a set of network functions that provide IP connectivity services to the subscriber. A CSN may provide the following functions:
MS IP address and endpoint parameter allocation for user sessions;
AAA proxy or server;
Policy and Admission Control based on user subscription profiles;
ASN-CSN tunnelling support;
Subscriber billing and inter-operator settlement;
Inter-CSN tunnelling for roaming;
Inter-ASN mobility.

The CSN can provide services such as location based services, connectivity for peer-to-peer services, provisioning, authorization and/or connectivity to IP multimedia services. The CSN may further comprise network elements such as routers, AAA proxy/servers, user databases, and interworking gateway MSs. In the context of IEEE 802.16m, the CSN may be deployed as part of a IEEE 802.16m NSP or as part of an incumbent IEEE 802.16e NSP.

Figure 8:
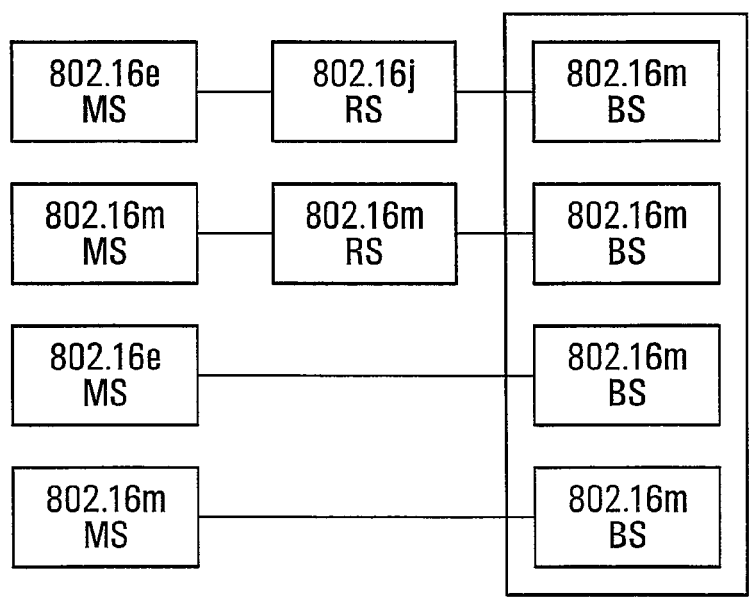
FIG. 8 shows FIG. 2 of IEEE 802.16m-08/003r1, a relay station in an overall network architecture.

In addition, RSs 15 may be deployed to provide improved coverage and/or capacity. With reference to FIG. 8, a BS 14 that is capable of supporting a legacy RS communicates with the legacy RS in the "legacy zone". The BS 14 is not required to provide legacy protocol support in the "16m zone". The relay protocol design could be based on the design of IEEE 802-16j, although it may be different from IEEE 802-16j protocols used in the "legacy zone".

Figure 9:
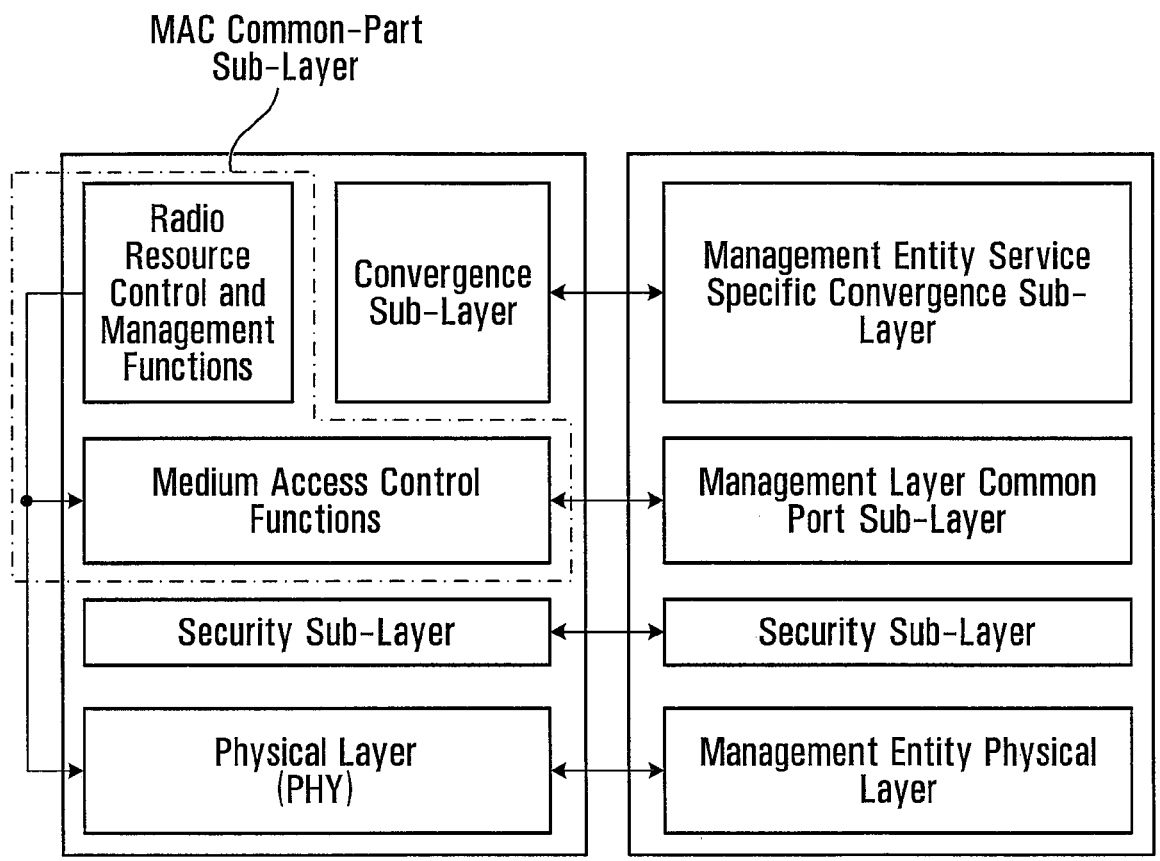
FIG. 9 shows FIG. 3 of IEEE 802.16m-08/003r1, a system reference model.

With reference now to FIG. 9, there is shown a system reference model, which applies to both the MS 16 and the BS 14 and includes various functional blocks including a Medium Access Control (MAC) common part sublayer, a convergence sublayer, a security sublayer and a physical (PHY) layer.

The convergence sublayer performs mapping of external network data received through the CS SAP into MAC SDUs received by the MAC CPS through the MAC SAP, classification of external network SDUs and associating them to MAC SFID and CID, Payload header suppression/compression (PHS).

The security sublayer performs authentication and secure key exchange and Encryption.

The physical layer performs Physical layer protocol and functions.

The MAC common part sublayer is now described in greater detail. Firstly, it will be appreciated that Medium Access Control (MAC) is connection-oriented. That is to say, for the purposes of mapping to services on the MS 16 and associating varying levels of QoS, data communications are carried out in the context of "connections". In particular, "service flows" may be provisioned when the MS 16 is installed in the system. Shortly after registration of the MS 16, connections are associated with these service flows (one connection per service flow) to provide a reference against which to request bandwidth. Additionally, new connections may be established when a customer's service needs change. A connection defines both the mapping between peer convergence processes that utilize the MAC and a service flow. The service flow defines the QoS parameters for the MAC protocol data units (PDUs) that are exchanged on the connection. Thus, service flows are integral to the bandwidth allocation process. Specifically, the MS 16 requests uplink bandwidth on a per connection basis (implicitly identifying the service flow). Bandwidth can be granted by the BS to a MS as an aggregate of grants in response to per connection requests from the MS.

Figure 10:
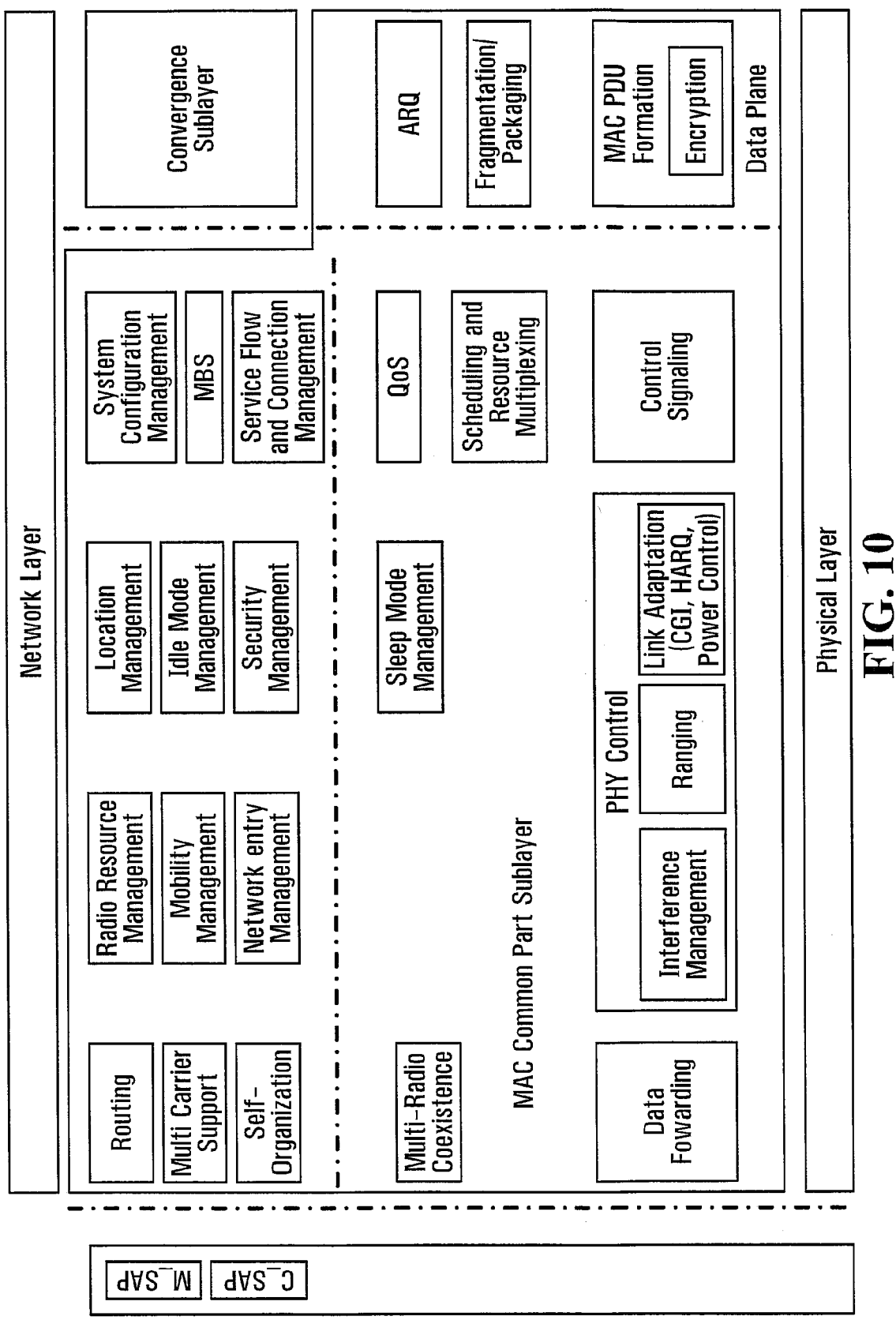
FIG. 10 shows FIG. 4 of IEEE 802.16m-08/003r1, the IEEE 802.16m protocol structure.

With additional reference to FIG. 10, the MAC common part sublayer (CPS) is classified into radio resource control and management (RRCM) functions and medium access control (MAC) functions.

The RRCM functions include several functional blocks that are related with radio resource functions such as:
  Radio Resource Management
  Mobility Management
  Network Entry Management
  Location Management
  Idle Mode Management
  Security Management
  System Configuration Management
  MBS (Multicast and Broadcasting Service)
  Service Flow and Connection Management
  Relay functions
  Self Organization
  Multi-Carrier Radio Resource Management The Radio Resource Management block adjusts radio network parameters based on traffic load, and also includes function of load control (load balancing), admission control and interference control.

Mobility Management

The Mobility Management block supports functions related to Intra-RAT/Inter-RAT handover. The Mobility Management block handles the Intra-RAT/Inter-RAT Network topology acquisition which includes the advertisement and measurement, manages candidate neighbor target BSs/RSs and also decides whether the MS performs Intra-RAT/Inter-RAT handover operation.

Network Entry Management

The Network Entry Management block is in charge of initialization and access procedures. The Network Entry Management block may generate management messages which are needed during access procedures, i.e., ranging, basic capability negotiation, registration, and so on.

Location Management

The Location Management block is in charge of supporting location based service (LBS). The Location Management block may generate messages including the LBS information.

Idle Mode Management

The Idle Mode Management block manages location update operation during idle mode. The Idle Mode Management block controls idle mode operation, and generates the paging advertisement message based on paging message from paging controller in the core network side.

Security Management

The Security Management block is in charge of authentication/authorization and key management for secure communication.

System Configuration Management

The System Configuration Management block manages system configuration parameters, and system parameters and system configuration information for transmission to the MS.

MBS (Multicast and Broadcasting Service)

The MBS (Multicast Broadcast Service) block controls management messages and data associated with broadcasting and/or multicasting service.

Service Flow and Connection Management

The Service Flow and Connection Management block allocates "MS identifiers" (or station identifiers—STIDs) and "flow identifiers" (FIDs) during access/handover/service flow creation procedures. The MS identifiers and FIDs will be discussed further below.

Relay Functions

The Relay Functions block includes functions to support multi-hop relay mechanisms. The functions include procedures to maintain relay paths between BS and an access RS.

Self Organization

The Self Organization block performs functions to support self configuration and self optimization mechanisms. The functions include procedures to request RSs/MSs to report measurements for self configuration and self optimization and receive the measurements from the RSs/MSs.

Multi-Carrier

The Multi-carrier (MC) block enables a common MAC entity to control a PHY spanning over multiple frequency channels. The channels may be of different bandwidths (e.g. 5, 10 and 20 MHz), be on contiguous or non-contiguous frequency bands. The channels may be of the same or different duplexing modes, e.g. FDD, TDD, or a mix of bidirectional and broadcast only carriers. For contiguous frequency channels, the overlapped guard sub-carriers are aligned in frequency domain in order to be used for data transmission.

The medium access control (MAC) includes function blocks which are related to the physical layer and link controls such as:
  PHY Control
  Control Signaling
  Sleep Mode Management
  QoS
  Scheduling and Resource Multiplexing
  ARQ
  Fragmentation/Packing
  MAC PDU formation
  Multi-Radio Coexistence
  Data forwarding
  Interference Management
  Inter-BS coordination PHY Control The PHY Control block handles PHY signaling such as ranging, measurement/feedback (CQI), and HARQ ACK/NACK. Based on CQI and HARQ ACK/NACK, the PHY Control block estimates channel quality as seen by the MS, and performs link adaptation via adjusting modulation and coding scheme (MCS), and/or power level. In the ranging procedure, PHY control block does uplink synchronization with power adjustment, frequency offset and timing offset estimation.

Control Signaling

The Control Signaling block generates resource allocation messages. Sleep Mode Management block handles sleep mode operation.

Sleep Mode Management

The Sleep Mode Management block may also generate MAC signaling related to sleep operation, and may communicate with Scheduling and Resource Multiplexing block in order to operate properly according to sleep period.

QoS

The QoS block handles QoS management based on QoS parameters input from the Service Flow and Connection Management block for each connection.

Scheduling and Resource Multiplexing

The Scheduling and Resource Multiplexing block schedules and multiplexes packets based on properties of connections. In order to reflect properties of connections Scheduling and Resource Multiplexing block receives QoS information from The QoS block for each connection.

ARQ

The ARQ block handles MAC ARQ function. For ARQ-enabled connections, ARQ block logically splits MAC SDU to ARQ blocks, and numbers each logical ARQ block. ARQ block may also generate ARQ management messages such as feedback message (ACK/NACK information).

Fragmentation/Packing

The Fragmentation/Packing block performs fragmenting or packing MSDUs based on scheduling results from Scheduling and Resource Multiplexing block.

MAC PDU Formation

The MAC PDU formation block constructs MAC PDU so that BS/MS can transmit user traffic or management messages into PHY channel. MAC PDU formation block adds MAC header and may add sub-headers.

Multi-Radio Coexistence

The Multi-Radio Coexistence block performs functions to support concurrent operations of IEEE 802.16m and non-IEEE 802.16m radios collocated on the same mobile station.

Data Forwarding

The Data Forwarding block performs forwarding functions when RSs are present on the path between BS and MS. The Data Forwarding block may cooperate with other blocks such as Scheduling and Resource Multiplexing block and MAC PDU formation block.

Interference Management

The Interference Management block performs functions to manage the inter-cell/sector interference. The operations may include:

MAC layer operation
Interference measurement/assessment report sent via MAC signaling
Interference mitigation by scheduling and flexible frequency reuse
PHY layer operation
Transmit power control
Interference randomization
Interference cancellation
Interference measurement
Tx beamforming/precoding Inter-BS Coordination The Inter-BS coordination block performs functions to coordinate the actions of multiple BSs by exchanging information, e.g., interference management. The functions include procedures to exchange information for e.g., interference management between the BSs by backbone signaling and by MS MAC messaging. The information may include interference characteristics, e.g. interference measurement results, etc.

Figure 11:
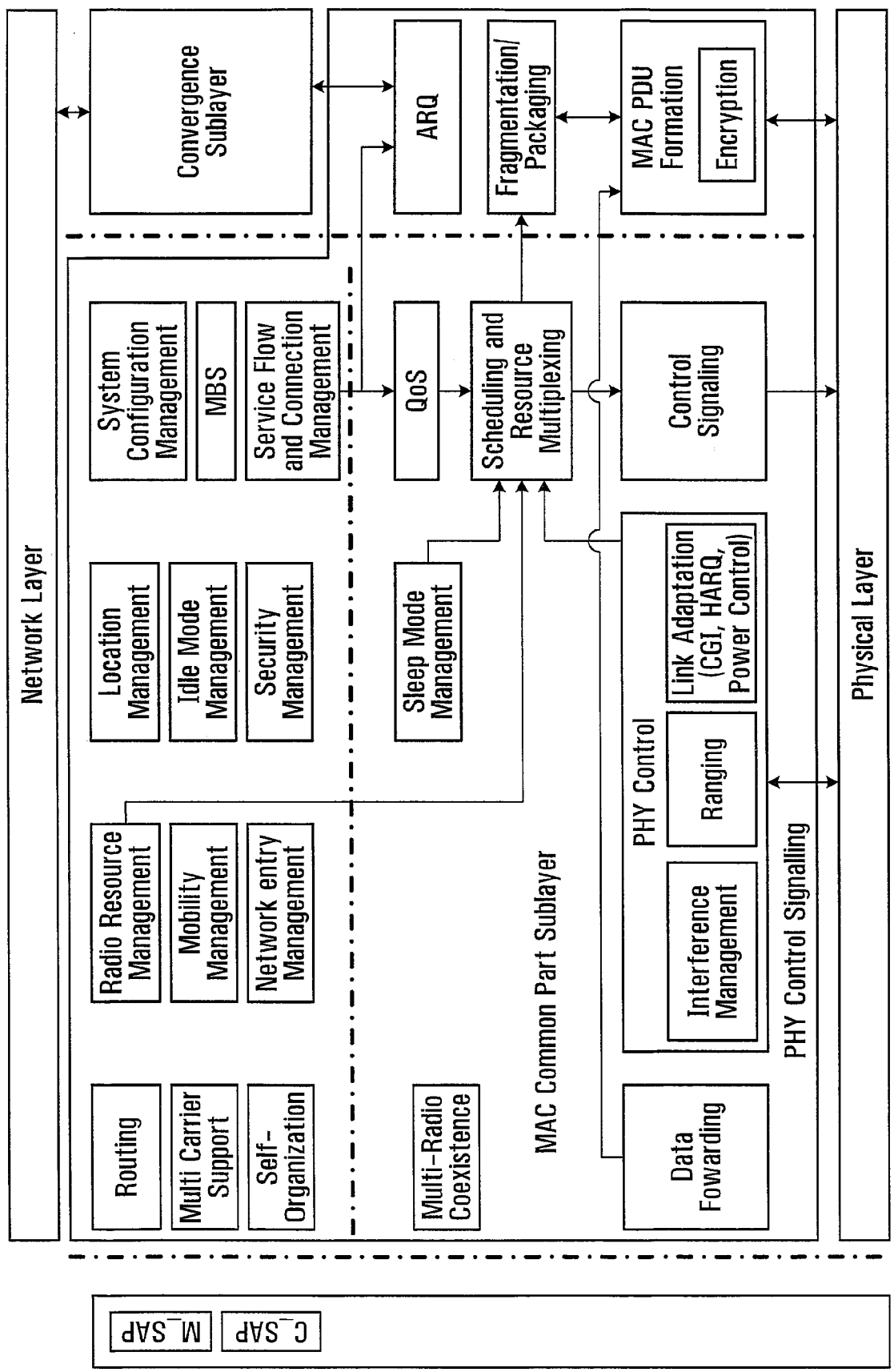
FIG. 11 shows FIG. 5 of IEEE 802.16m-08/003r1, the IEEE 802.16m MS/BS data plane processing flow.

Reference is now made to FIG. 11, which shows the user traffic data flow and processing at the BS 14 and the MS 16. The dashed arrows show the user traffic data flow from the network layer to the physical layer and vice versa. On the transmit side, a network layer packet is processed by the convergence sublayer, the ARQ function (if present), the fragmentation/packing function and the MAC PDU formation function, to form MAC PDU(s) to be sent to the physical layer. On the receive side, a physical layer SDU is processed by MAC PDU formation function, the fragmentation/packing function, the ARQ function (if present) and the convergence sublayer function, to form the network layer packets. The solid arrows show the control primitives among the CPS functions and between the CPS and PHY that are related to the processing of user traffic data.

Figure 12:
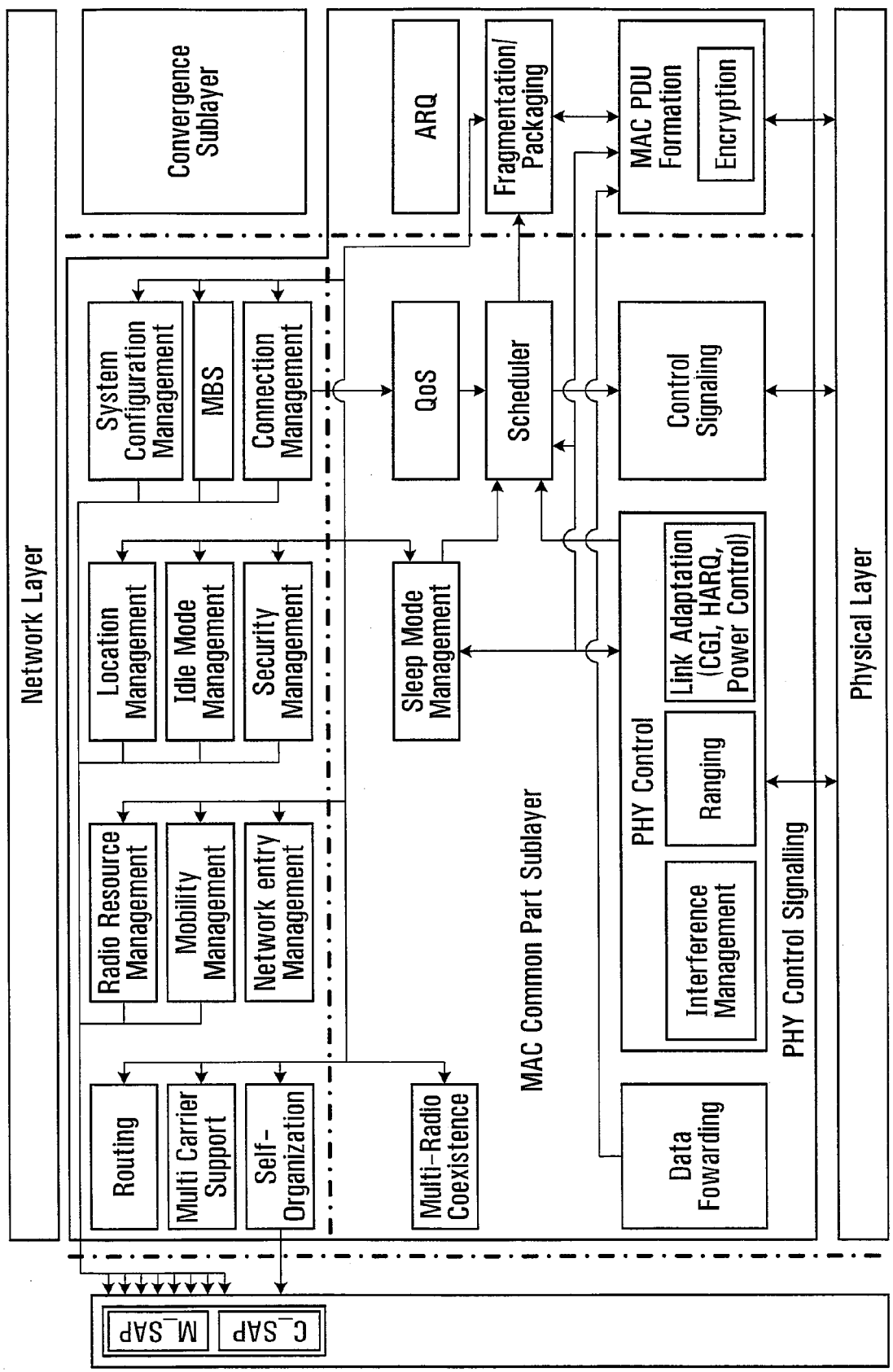
FIG. 12 shows FIG. 6 of IEEE 802.16m-08/003r1, the IEEE 802.16m MS/BS control plane processing flow.

Reference is now made to FIG. 12, which shows the CPS control plane signaling flow and processing at the BS 16 and the MS 14. On the transmit side, the dashed arrows show the flow of control plane signaling from the control plane functions to the data plane functions and the processing of the control plane signaling by the data plane functions to form the corresponding MAC signaling (e.g. MAC management messages, MAC header/sub-header) to be transmitted over the air. On the receive side, the dashed arrows show the processing of the received over-the-air MAC signaling by the data plane functions and the reception of the corresponding control plane signaling by the control plane functions. The solid arrows show the control primitives among the CPS functions and between the CPS and PHY that are related to the processing of control plane signaling. The solid arrows between M_SAP/C_SAP and MAC functional blocks show the control and management primitives to/from Network Control and Management System (NCMS). The primitives to/from M_SAP/C_SAP define the network involved functionalities such as inter-BS interference management, inter/intra RAT mobility management, etc, and management related functionalities such as location management, system configuration etc.

Figure 13:
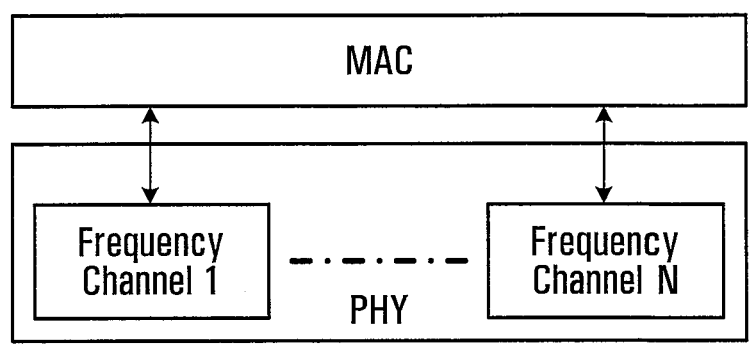
FIG. 13 shows FIG. 7 of IEEE 802.16m-08/003r1, generic protocol architecture to support multicarrier system.

Reference is now made to FIG. 13, which shows a generic protocol architecture to support a multicarrier system. A common MAC entity may control a PHY spanning over multiple frequency channels. Some MAC messages sent on one carrier may also apply to other carriers. The channels may be of different bandwidths (e.g. 5, 10 and 20 MHz), be on contiguous or non-contiguous frequency bands. The channels may be of different duplexing modes, e.g. FDD, TDD, or a mix of bidirectional and broadcast only carriers.

The common MAC entity may support simultaneous presence of MSs 16 with different capabilities, such as operation over one channel at a time only or aggregation across contiguous or non-contiguous channels.

In OFDM and OFDMA wireless communication systems, any mobile station 16 that intends to enter the system needs to establish time and frequency synchronization with a base station 14 that is transmitting signals, as well as obtain identification information (such as the cell ID) of the transmitting device, which in most cases is a base station 14. The mobile station 16 must thus synchronize to the base station 14 and detect certain base station parameters, such as the cell ID. The cell ID is generally obtained by detecting a preamble used by the certain base station 14 that is inserted into each signal frame that is issued from the base station 14. Although the transmitting device will be described herein as being a base station 14, it should be appreciated that the transmitting device could also be a relay station 15.

In general, preambles may provide at least one of the following operations: fast base station access, base station identification/selection and C/I ratio measurement, framing and timing synchronization, frequency and sampling clock offset estimation and initial channel estimation. Ideally, a frame preamble is designed in order to have minimized overhead in order to provide greater spectral efficiency and radio capacity.

Due to an increase of channel bandwidth in broadband wireless access, as well as an increase in FTT size, searching for a preamble in a received signal can require high computational complexity by the mobile station 16.

In evolved versions of wireless communication systems such as 802.16m, the frame structure is such that new preamble configuration is desirable. It is possible for this configuration to provide relative timing of primary secondary preambles, use of a primary synchronisation channel to convey other information to the mobile (including signalling timing/location of secondary preamble, group ID (specifically to a group of localized cells), bandwidth and/or multi-carrier structure, legacy system parameters, other information useful to the mobile), structure and/or position of the synchronization channels relative to multi-carrier structures, specific code structure for mobile base/relay stations, relative timing options for preambles and superframe header.

In accordance with an embodiment of the present invention, each frame in an OFDM signal is provided with at least a first preamble and a second preamble. The first preamble is designed such that the overall searching for the first preamble and the second preamble is relatively fast and requires less computational complexity than existing preamble designs. The first preamble and the second preamble may be used for coarse timing and frame synchronization, cell ID identification and frequency synchronization. The first and second preambles may also support frequency domain fine frequency synchronization. In addition the control information is conveyed on the preamble, reduced ambiguity in timing of primary and secondary synchronization channels is provided, the number of total cell IDs is increased, and there is less ambiguity in multicarrier preamble placements. Although a first and second preamble will be described for simplicity below, it should be appreciated that the present invention could also be implemented using three or more preambles within a signal frame.

As will be described in more detail below, the first preamble and the second preamble provide first and second synchronization sequences that enable a mobile station to gain access to a base station or to a plurality of base stations. At least one of the first and second preambles may coexist with the existing legacy preamble, or replace the legacy preamble. The term "legacy preamble" is intended to include the prior art preamble in an OFDMA frame, as described in IEEE802.16-2004.

The first preamble comprises a first synchronization sequence capable of conveying information. In accordance with a non-limiting example, at least a portion of the first synchronization sequence is capable of conveying a "cell group ID" that is associated to a group of base stations. The group of base stations may be grouped together on the basis of geography or a common characteristic, such as being mobile base stations, among other possibilities.

As will be described in more detail below, the first synchronization sequence of the first preamble may further convey additional information relating to different attributes or parameters associated with the transmitting base station 14 or the certain group of base stations to which the transmitting base station 14 belongs. The first synchronization sequence may also contain certain control information that is intended to be conveyed to a mobile device 16.

The second preamble comprises a second synchronization sequence that conveys information indicative of a "local ID" associated to the transmitting base station 14 within the group of base stations. As such, when combined, the first synchronization sequence and the second synchronization sequence convey a unique cell ID of the transmitting base station. The combination of the first synchronization sequence and the second synchronization sequence may also convey certain control information to a mobile device 16.

Figure 14:
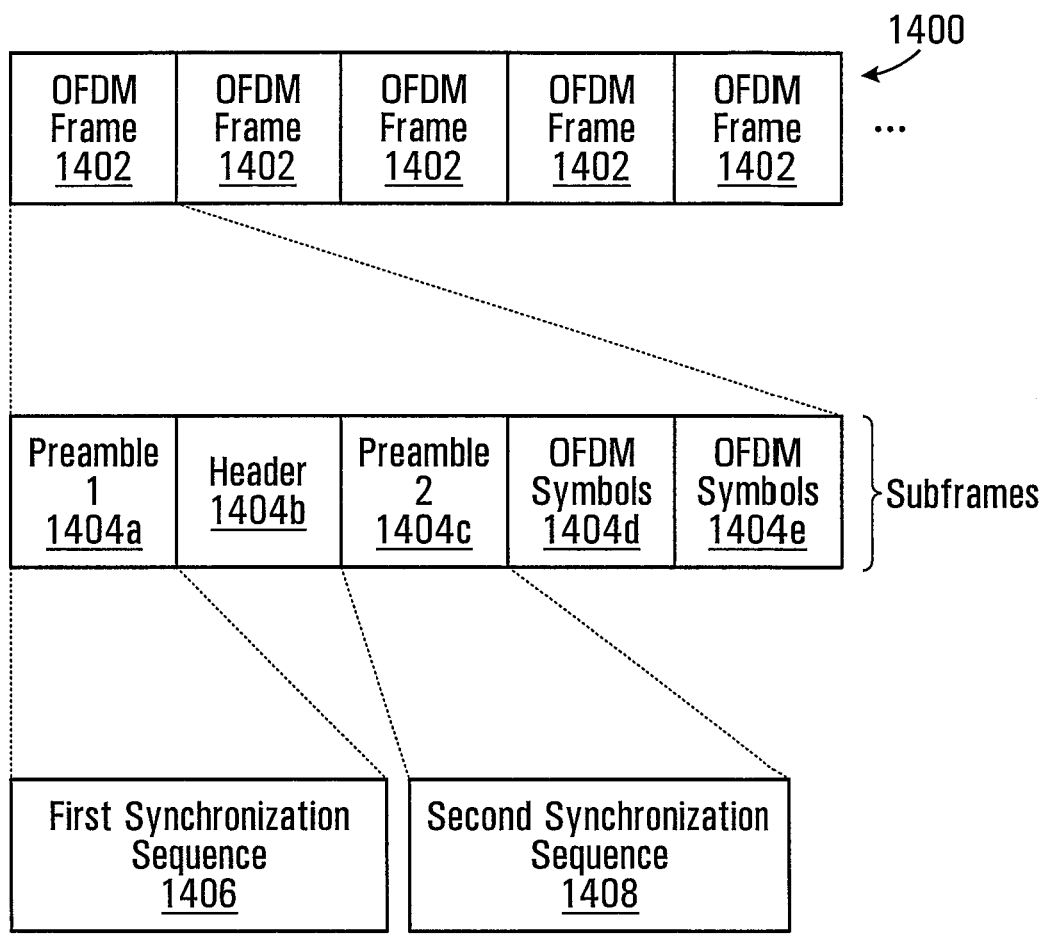
FIG. 14 shows an example of a signal comprising frames, subframes and first and second synchronization sequences.

Shown in FIG. 14 is a non-limiting example of an OFDM signal 1400 employed by the present invention. This OFDM signal 1400 is sent as a plurality of sequential OFDM frames 1402 or blocks that typically contain 1000 bits of data. Each OFDM frame 1402 comprises a number of subframes, which have been numbered 1404*a-e* in the non-limiting example illustrated. It should be appreciated that each OFDM frame 1402 could include a different number of subframes 1404. The subframes are allocated for preambles, headers or OFDM symbols, as will be described in more detail below. Furthermore, the subframes could be on different subcarriers. The structure could be similar to, but not limited by, the one proposed in 802.16m, which is envisaged to be similar to those that will be developed in 3GPP and 3GPP2 technologies.

In the example shown in FIG. 14, subframe 1404*a* contains the first preamble, which comprises the first synchronization sequence 1406 and subframe 1404*c* contains the second preamble which comprises the second synchronization sequence 1408. Subframe 1404*b* contains a header. Subframes 1404*d* and 1404*e* contain the OFDM symbols, which are used to transmit voice data, video data, control information or any other data of information intended to be transmitted to a receiving mobile station 16 over the wireless network.

It should be appreciated that the relative position or location within the OFDM frame of the preambles, header and OFDM signals can be fixed for each OFDM frame or can vary from one OFDM frame to the next. In some cases, the first preamble ("preamble 1") can be sent on the first subframe and the second preamble ("preamble 2") can be sent on the second subframe. Alternatively, it is possible for the second preamble to be positioned before the first preamble. For example, in some embodiments, the first preamble is sent on a subframe immediately following the subframe containing the second preamble. In alternative embodiments, the header is sent on the subframe immediately following the second preamble. In some cases, the header is a superframe header, such that it is not included within each frame, and instead is only included within every fourth or fifth frame, for example. In such a situation, the first preamble and the second preamble may be adjacent to one another, or separated by subframes containing OFDM symbols.

Given that the relative position of the first and second preambles can vary, in accordance with the present invention, the first preamble is designed to convey information indicative of the location within the frame of the second preamble. In this manner, when the OFDM frames are received at a mobile station 16, it is easier and faster for the receiving mobile station 16 to search for, and locate, both the first and second preambles.

The information indicative of the location, or relative location, within the OFDM frame of the second preamble, is generally carried via the first synchronization sequence of the first preamble. More specifically, the first synchronization sequence is able to convey information indicative of the location of the second preamble within the OFDM frame. The first synchronization sequence may convey information indicative of a relative timing between the first preamble and the second preamble, or the first synchronization sequence may convey information indicative of an offset or relative location between the first preamble and the second preamble. Based on this information a mobile station 16 that receives the OFDM signal is able to quickly determine where to look in an OFDM frame for the second preamble, thereby greatly reducing the time and computational complexity necessary to find the second preamble and establish synchronization with the base station 14 and identify the unique Cell ID of the transmitting base station 14.

As mentioned above, the first preamble carries the information indicative of the location within the OFDM frame of the second preamble using a first synchronization sequence. In a non-limiting example, the first preamble may use 1 of 40 synchronization sequences, wherein the synchronization sequence is made up of a first portion that provides 1 of 10 possible "cell group IDs" and a second portion that provides 1 of 4 possible offsets between the first preamble and the second preamble. As such, the synchronization sequence is made up of a first portion that provides a "cell group ID" of a group of base stations to which the transmitting base station belongs, and a second portion that provide an indication of an "offset" between the first preamble and the second preamble. By signalling the "offset", the receiving mobile station 16 will not have to search each subframe position for the second preamble. Instead, the mobile station 16 will know exactly where to look, thereby reducing the searching complexity.

It should be appreciated that any number of synchronization sequences could be used by the first preamble, and that the first portion is not limited to 1 of 10 sequences. In addition, instead of the second portion of the synchronization sequence providing an indication of an "offset" between the first preamble and the second preamble, the second portion of the synchronization sequence could provide an indication of a relative timing between the two preambles.

The first synchronization sequence may further comprise a third portion that conveys other information, which could be control information or information indicative of an attribute or parameter associated with the group of base stations. The third portion could also convey information indicative of a relative location of the header or superframe header, or the relative position between the first preamble and a legacy frame, among other possibilities.

As mentioned above, the second preamble comprises a second synchronization sequence that conveys a "local ID" associated with the transmitting base station within the group of base stations. For example, the second synchronization sequence could use 1 of 114 sequences (or any other possible number of sequences), that are each respectively associated with a different base station in the group of base stations. As such, when the first portion of the first synchronization sequence (which indicates a group of base stations) is combined with the second synchronization sequence (which indicates the transmitting base station within the group) a complete cell ID is obtained.

The second synchronization sequence may simply carry the local ID of the transmitting base station 16, or alternatively may carry additional information as well. For example, the second synchronization may comprise a first portion that carries the "local ID" of the transmitting base station 16, and a second portion that carries additional information, such as control information, or a portion of control information that when combined with a portion of the first synchronization sequence conveys control information.

In accordance with a non-limiting example, the first synchronization sequence belongs to a first set of synchronization sequences and the second synchronization sequence belongs to a second set of synchronization sequences. The first set of synchronization sequences is preferably smaller than the second set of synchronization sequences, in order to facilitate the ease and speed of searching for the first preamble. In the example given above, the first synchronization sequence belongs to a set of 40 synchronization sequences and the second synchronization sequence belongs to a set of 114 synchronization sequences. This facilitates faster searching for the primary sequence, and given that the primary sequence provides the location within the signal frame of the second preamble, the overall time and complexity required for searching for both the first and second preambles is greatly reduced.

As mentioned above, the first synchronization sequence includes at least a portion that conveys a "cell group ID". As such, a group of base stations (such as a local cluster of base stations) share a common portion of the first synchronization sequence. Moreover, the "cell group ID" portion of the synchronization sequence is common to every base station within that group of base stations. The synchronization of a mobile station 16 with a transmitting base station 14 can be facilitated by the use of macro-diversity, wherein all of the base stations within a group of base stations issue signal frames having the same "cell group ID" sequence at the same time over the same resources. By all the base stations 14 within the group of base stations transmitting the same "cell group ID" sequence at the same time, a receiving mobile station 16 is able to identify the commonly issued sequence, and thus the first preamble, with greater ease. Once the first preamble has been identified, the receiving mobile station 16 can then identify the location of the second preamble within the OFDM signal frame, which gives the "local ID" of the transmitting base station such that the base stations within the group can be differentiated. The receiving mobile station 16 then knows the unique Cell ID of the transmitting base station 14.

Referring back to FIG. 1, it is possible for some of the base stations 14 and/or relays 15 to be mobile, such that they are moving transmitters. In accordance with a non-limiting embodiment, the mobile base stations 14 and/or relays 15 may be associated with a dedicated "cell group ID" sequence. Moreover, one or more "cell group IDs" from the set of "cell group IDs" may be reserved for these moving transmitters, so as to be able to differentiate them from the fixed base stations 14 and relays 15. In this manner, a mobile station 16 that receives signals from these moving transmitters can detect that they are moving on the basis of the "cell group ID" sequence. A "cell group ID" sequence may be associated with both mobile base stations 14 and relays 15, or the mobile base stations 14 and mobile relays 15 may be associated with different "cell group ID" sequences, such that a receiving mobile station 14 can detect whether it is receiving from either a base station 14 or a relay 15.

In order to further simplify and facilitate searching and initial detection of the preambles, the first and second preambles may be confined to being transmitted over one or more carrier frequencies in certain predefined manners. For example, at least a portion of one of the first and second preambles may be carried by a synchronization channel that is subject to the following conditions:

- the synchronization channel may be confined to a fixed bandwidth within a carrier frequency, which may be the minimum carrier frequency. For example, the synchronization channel may be fixed at 5 MHz;
- the synchronization channel may be restricted to being present only over a primary carrier frequency that is able to carry control information;
- the synchronization channel may be restricted to being aligned with one edge of the carrier frequency; and
- in multi-carrier embodiments, the synchronization channel may be restricted to being sent over only the smaller one of the multi-carrier frequencies.

Figure 15:
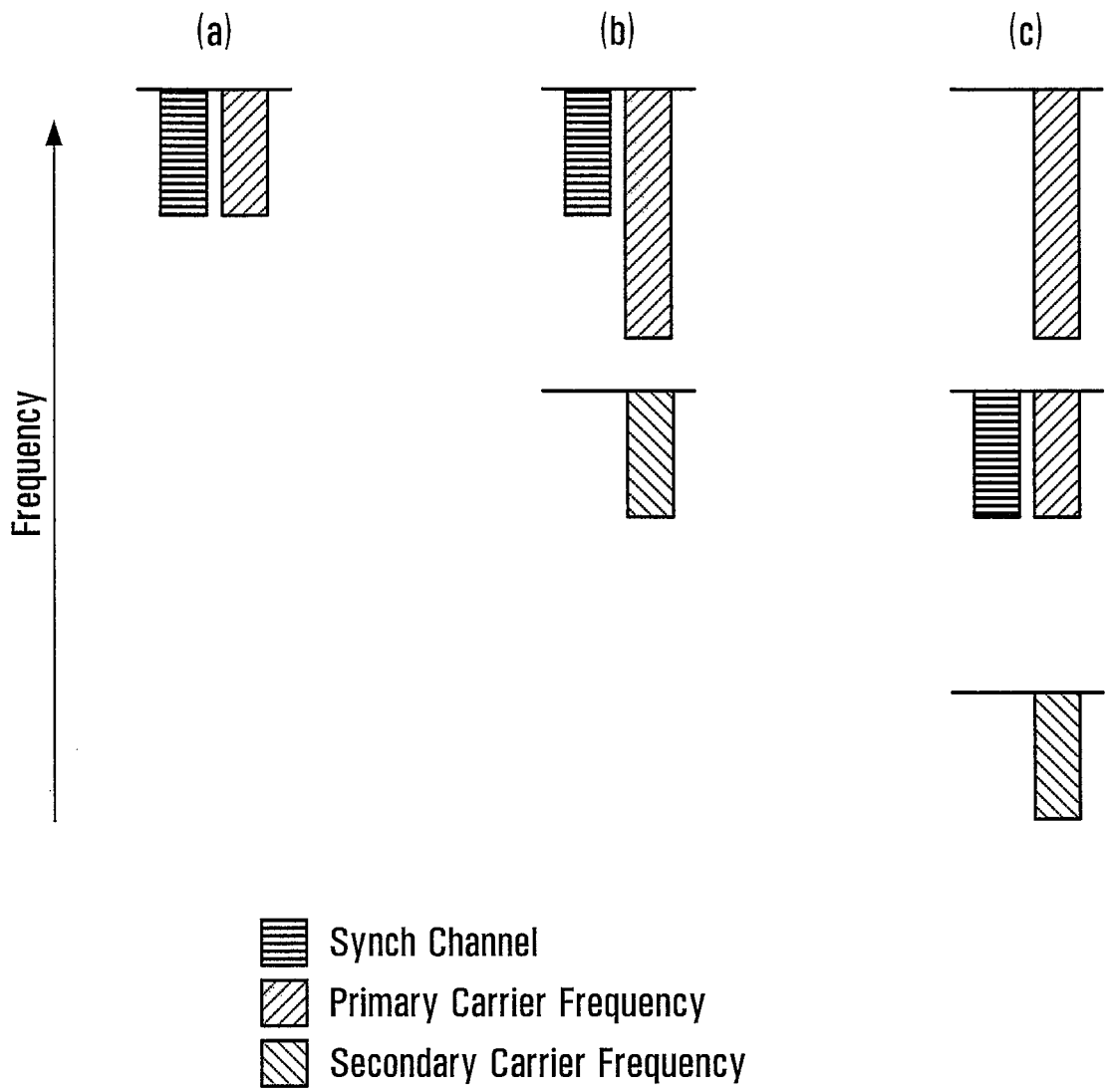
FIGS. 15($a$)-($c$) show non-limiting representations of a synchronization channel in relation to primary and secondary carrier frequencies.

Shown in FIGS. 15(*a*) through 15(*c*) are some graphical representations of the synchronization channel in relation to one or more carrier frequency channels that illustrate the above restrictions. As shown in FIG. 15(a), the synchronization channel has the same bandwidth as the primary carrier frequency (which is restricted to 5 MHz), and is aligned with both edges of the primary carrier frequency. Shown in FIG. 15(b) is a primary carrier frequency that has a greater bandwidth than the synchronization channel. The synchronization channel has a fixed bandwidth and is aligned with one edge of the primary carrier frequency. The synchronization channel is carried over the primary carrier frequency, which is able to carry control information. The secondary carrier frequency is shown without the synchronization channel. As used herein, the primary carrier frequency is able to carry control information, whereas the secondary carrier frequency is not. Shown in FIG. 15(c) are two primary carrier frequencies. The synchronization channel is carried over the smaller of the two primary carrier frequencies, and the secondary carrier is without a synchronization channel. In an alternative embodiment, it is possible that both of the primary carrier frequencies carry a synchronization channel. In such a case, the first primary carrier frequency would have a greater bandwidth that the synchronization channel.

In a further embodiment, at least a portion of the first and second preambles may be carried by primary and secondary synchronization channels that are transmitted over one or more carrier frequencies according to certain predefined conditions. For example, the primary and secondary synchronization channels may be subject to the following conditions:

the primary synchronization channel may be confined to a fixed bandwidth that may be the minimum carrier frequency, such as 5 MHz. Whereas, the secondary synchronization channel can have a wider bandwidth, that includes the entire bandwidth of the carrier frequency;

the primary and secondary synchronization channels may be restricted to being present only over a primary carrier frequency that is able to carry control information. However, in alternative embodiments, the secondary synchronization channel may be present on all carrier frequencies;

the primary synchronization channel may be restricted to being aligned with one edge of the carrier frequency; and in multi-carrier embodiments, the primary synchronization channel may be restricted to being sent over only the smaller one of the multi-carrier frequencies, whereas, the secondary synchronization channel may be present on all carrier frequencies.

Figure 16:
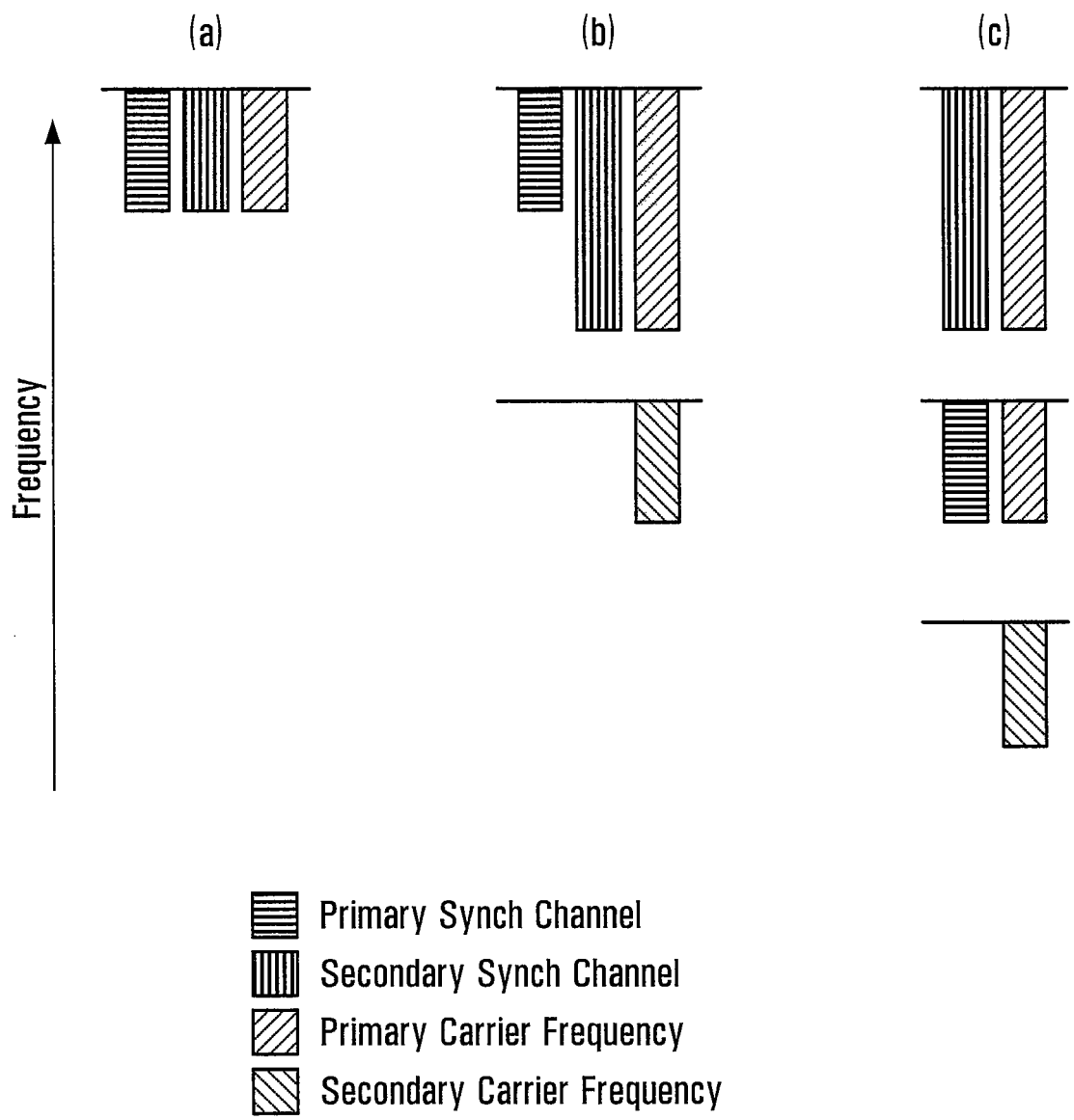
FIGS. 16($a$)-($c$) show non-limiting representations of primary and secondary synchronization channels in relation to primary and secondary carrier frequencies.

Shown in FIGS. 16(a) through 16(c) are some graphical representations of the primary and secondary synchronization channels in relation to one or more carrier frequency channels. As shown in FIG. 16(a), both the first and second synchronization channels have the same bandwidth (which is restricted to 5 MHz) as the primary carrier frequency. In addition, both the first and second synchronization channels are aligned with an edge of the primary carrier frequency. Shown in FIG. 16(b) are both the primary and secondary synchronization channels carried over the primary carrier frequency. The primary synchronization channel is restricted to the 5 MHz bandwidth, whereas the secondary synchronization channel has a greater bandwidth, which is the bandwidth of the primary carrier frequency. Both the primary and secondary synchronization channels are aligned with one edge of the primary carrier frequency. Shown in FIG. 16(c) is a multi-channel embodiment, wherein the secondary synchronization channel is carried over the larger of the two primary carrier frequencies and the primary synchronization channel is carried over the smaller of the two primary carrier frequencies. The secondary carrier frequency is shown without a synchronization channel.

The manner in which a signal frame is generated in order to include both the first preamble and the second preamble will now be described in more detail with reference to FIGS. 2 and 17. Referring back to FIG. 2, one or more processing modules at the control entity 20 and/or baseband processor 22 are able to determine where within a signal frame that first and second preambles should be located, and generate the first and second preambles in order to be able to convey at least some of the information described above to a receiving device, such as a mobile station 16.

Figure 17:
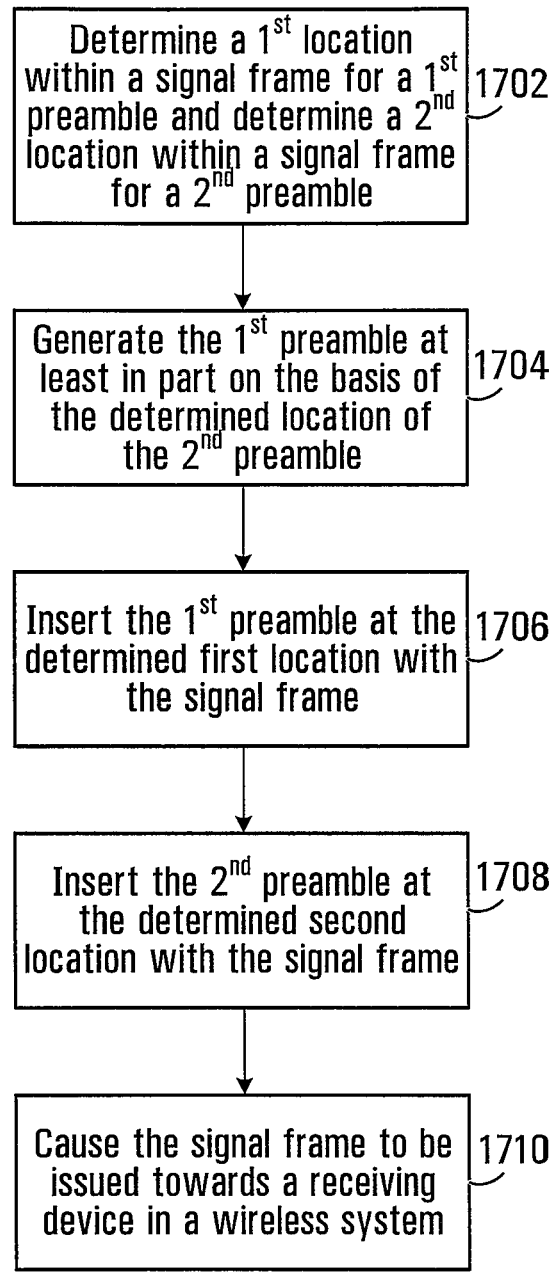
FIG. 17 shows a non-limiting example of a method used by a transmitting device in order to transmit signals in a wireless communication environment.

Shown in FIG. 17 is a flow diagram illustrating the process used by the one or more processing modules in order to generate and position within a signal frame the first and second preambles. Firstly, at step 1702, the process involves determining a first location within the signal frame that a first preamble should be located and determining a second location within the signal frame that a second preamble should be located. This determination can be done based on a variety of criteria, such as the frame length, the channel conditions, weather or not a superframe header is included, etc. As mentioned above, the second preamble may be positioned within the signal frame at a location prior to the first preamble.

At step 1704, the process involves generating the first preamble. As mentioned above, the first preamble comprises a first synchronization sequence that includes at least a first portion that provides a "cell group ID" and a second portion that provides information indicative of the location of the second preamble within the signal frame. As such, the first preamble is generated at least in part on the basis of the determined location of the second preamble.

The first portion of the first synchronization sequence, which provides the "cell group ID", may be known to the base station, such that the synchronization sequence indicative of the "cell group ID" is included within each signal frame that is issued by the base station 14. Alternatively, it is possible that the synchronization sequence associated with the "cell group ID" is provided to the base station by the base station controller. In yet a further alternative, it is possible that a look-up table (located either locally or remotely) is accessed in order to determine the synchronization sequence associated with the "cell group ID" to which the transmitting base station belongs. In the case where a look-up table is accessed, the synchronization sequence associated with the "cell group ID" may be determined on a basis of the cell group ID, a characteristic of the transmitting base station, such as the geographical coordinates of the base station, the local ID of the base station, or any other possible characteristic or attribute known to the transmitting base station.

The second portion of the first synchronization sequence, which provides information indicative of a location within the signal frame of the second preamble, is established on the basis of the location determined at step 1702 for the second preamble. For example, a different sequence portion is associated with each of the different possible locations within the signal frame where the second preamble could be located. In the example given above, the second preamble could be located at 1 of 4 different offset positions in relation to the first preamble. Each one of the offset positions can be associated with a respective one of four possible synchronization sequence portions. As such, on the basis of the offset position, the corresponding synchronization sequence portion is determined and added to the first synchronization sequence. The corresponding synchronization sequence portion can be determined on the basis of a look-up table (located either locally or remotely) that maps different offset positions to different synchronization sequence portions.

Although the example of an offset between the first preamble and the second preamble is provided above, it should be appreciated that other synchronization sequence portions could be used in order to convey a relative timing between the first preamble and the second preamble.

The process of generating the first preamble may further comprises adding additional information that conveys different attributes and/or properties relating to the transmitting base station or the group of base stations to which the transmitting base station belongs. The first preamble could also convey control information. This additional information conveyed by the first preamble could be carried via other synchronization sequence portions, among other possibilities.

At step 1706, the first preamble is inserted within the signal frame at the first location determined at step 1702, and at step 1708 the second preamble is inserted within the signal frame at the second location determined at step 1702. The second preamble is generated in much the same way as the first preamble. As described above, the second preamble comprises a second synchronization sequence that conveys a local ID associated with the transmitting base station. This second synchronization sequence indicative of the local ID may be known by the transmitting base station, such that it is included within each signal frame that is issued by the base station 14.

Finally, at step 1710, once the appropriate signal modulation has taken place, the signal frame is caused to be issued towards a receiving mobile station 16 in the wireless network.

The wireless signal that has been issued over the wireless network by the transmitting base station is received by a receiving mobile station 16. The manner in which the signal frame is handled by the receiving mobile station 16 will now be described in more detail with respect to FIGS. 3 and 18.

Referring back to FIG. 3, the receiving circuitry 38 receives the signals issued over the wireless network and passes those signals to the baseband processor 34. One or more processing modules at the control entity 32 and/or baseband processor 34 are then able to search for and identify the first and second preambles contained within a given signal frame.

Figure 18:
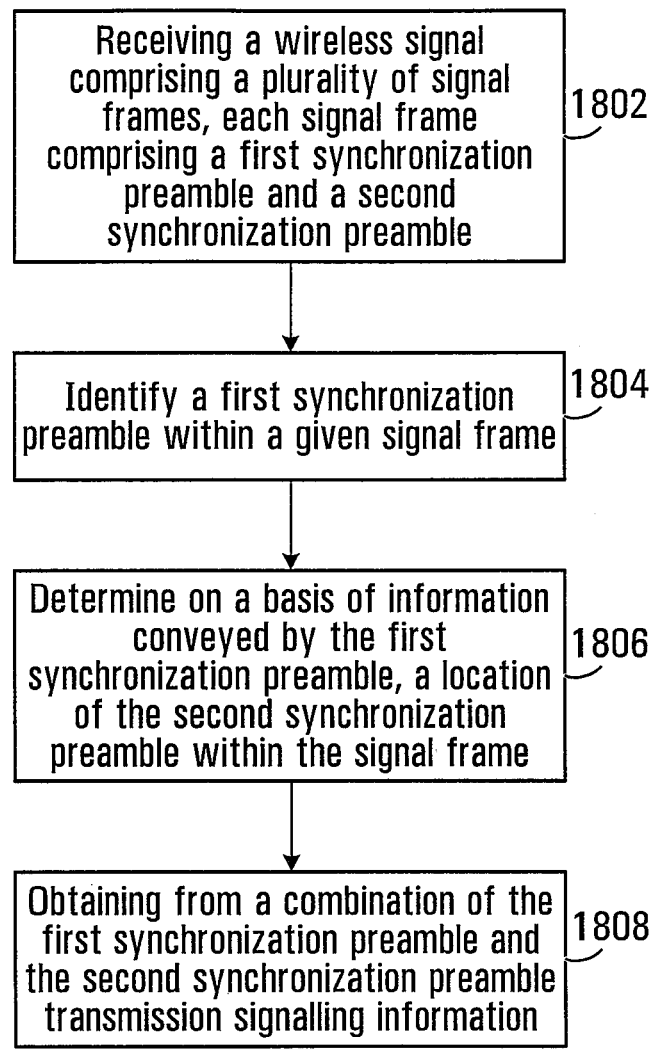
FIG. 18 shows a non-limiting example of a method used by a receiving device in order to receive signals over a wireless communication environment.

Shown in FIG. 18 is a flow diagram illustrating the process of receiving and identifying the first and second preambles within a signal frame. Firstly, at step 1802, the wireless signal comprising a plurality of signal frames is received at the receiving circuitry 38. Each of the signal frames comprises a first preamble and a second preamble. At step 1804, one or more processing modules at the baseband processor 34 and/or control entity 32 identify the first synchronization preamble within a signal frame. The identification of the first synchronization signal may be done by identifying a repetitively occurring synchronization sequence (which will be at least a portion of the first synchronization sequence) that is contained in each of the signal frames.

As mentioned above, the first synchronization sequence may be 1 of 40 possible synchronization sequences that are known to the receiving mobile station 16. As such, the receiving mobile station will "look out" for repetitively occurring ones of these known sequences in received signals. Once one of the sequences is detected within a signal frame, the receiving mobile station 16 will know that the first preamble has been detected, such that frame frequency and timing synchronization can be performed. Furthermore, once the first synchronization sequence has been detected, the receiving mobile station 16 can determine both the "cell group ID" and the location of the second preamble.

In keeping with the example described above, the first synchronization sequence comprises a first portion that provides the "cell group ID", and a second portion that provides an indication of the location of the second preamble. In accordance with a non-limiting embodiment, the receiving mobile station 16 may compare the first synchronization sequence (or the first and/or second portions thereof) with known sequences contained in a look-up table that map synchronization sequences (or portions thereof) to cell group IDs and different offset or timing locations within the signal frame. By comparing the detected first synchronization sequence (or portions thereof) with sequences contained in the look-up table, the "cell group ID" and the offset or timing between the first and second preambles may be determined. Alternatively, the first portion of the synchronization sequence itself may be the "cell group ID". The location of the second preamble within a signal frame is identified on the basis of information conveyed by the first preamble, and specifically on the information carried by at least a portion of the first synchronization sequence.

In this manner, at step 1806, the location of the second preamble within a signal frame can be identified on the basis of information conveyed by the first preamble. This greatly reduces the searching complexity associated with identifying the location of the second preamble. Once the location has been identified, the receiving mobile station 16 is able to access the second preamble which conveys information indicative of a local ID. More specifically, the information indicative of the local ID of the transmitting base station can be carried by a second synchronization sequence. The local ID of the transmitting base station may be the second synchronization sequence, or a look-up table can be accessed that maps known second synchronization sequences to respective local IDs of various transmitting base stations within the group of base stations associated to the cell group ID.

At step 1808, once both the first and second preambles have been identified, transmission signalling information can be obtained from the combination of the first preamble and the second preamble. In accordance with a non-limiting embodiment, the transmission signalling information can be the unique Cell ID of the transmitting base station 14.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. A method of transmitting data within a signal frame, the method comprising:
   a) inserting a first synchronization preamble into a first location within the signal frame;
   b) inserting a second synchronization preamble into a second location within the signal frame, wherein the first synchronization preamble conveys information indicative of the second location;
   c) issuing the signal frame towards a receiving device in a wireless communication environment.

2. The method as defined in claim 1, wherein the signal frame is a frame of an Orthogonal Frequency Division Multiplexing (OFDM) signal.

3. The method as defined in claim 1, wherein the information indicative of the second location is carried via a first synchronization sequence.

4. The method as defined in claim 3, wherein the first synchronization sequence conveys information indicative of a relative timing between the first preamble and the second preamble.

5. The method as defined in claim 3, wherein the first synchronization sequence conveys information indicative of an offset between the first synchronization preamble and the second synchronization preamble.

6. The method as defined in claim 3, wherein the first synchronization sequence further conveys information indicative of an identification of a group of transmitting devices, the signal frame being issued towards the receiving device by a certain transmitting device belonging to the group of transmitting devices.

7. The method as defined in claim 6, wherein the group of transmitting devices all transmit the first synchronization sequence at a same time.

8. The method as defined in claim 6, wherein the second synchronization preamble conveys information indicative of a local ID of the certain transmitting device belonging to the group of transmitting devices.

9. The method as defined in claim 8, wherein the information indicative of a local ID of the certain transmitting device is carried via a second synchronization sequence.

10. The method as defined in claim 9, wherein a combination of the first synchronization sequence and the second synchronization sequence conveys a cell ID of the certain transmitting device that issues the signal frame towards the receiving device.

11. The method as defined in claim 9, wherein at least one of the first synchronization sequence and the second synchronization sequence conveys control information.

12. The method as defined in claim 6, wherein at least a portion of the first synchronization sequence is indicative that the group of transmitting devices is a group of mobile transmitting devices.

13. The method as defined in claim 3, wherein the first synchronization sequence further conveys information indicative of at least one of a relative timing and a relative position of a broadcast header in relation to the first synchronization preamble.

14. The method as defined in claim 3, wherein the first synchronization sequence further conveys information indicative of at least one of a relative timing and a relative position of a legacy frame in relation to the first synchronization preamble.

15. The method as defined in claim 14, wherein the first synchronization sequence belongs to a first sequence set and the second synchronization sequence belongs to a second sequence set, the first sequence set being smaller than the second sequence set.

16. The method as defined in claim 15, wherein at least one synchronization sequence within the first sequence set is associated with a group of mobile transmitting devices.

17. The method as defined in claim 1, wherein the first synchronization preamble and the second synchronization preamble are transmitted over a carrier frequency, at least one of the first synchronization preamble and the second synchronization preamble being confined to a fixed bandwidth of the carrier frequency.

18. The method as defined in claim 17, wherein the fixed bandwidth has the same bandwidth as the carrier frequency.

19. The method as defined in claim 17, wherein the fixed bandwidth is smaller than a bandwidth of the carrier frequency.

20. The method as defined in claim 19, wherein the fixed bandwidth is aligned with an edge of the carrier frequency.

21. The method as defined in claim 17, wherein the first synchronization preamble and the second synchronization preamble are transmitted over a given one of two carrier frequencies, the given one of the two carrier frequencies being capable of transmitting control information.

22. The method as defined in claim 17, wherein at least one of the first synchronization preamble and the second synchronization preamble are transmitted over a smaller one of two carrier frequencies.

23. A method for generating a signal frame, comprising:
a) determining a first location within the signal frame for inserting a first synchronization preamble and a second location within the signal frame for inserting a second synchronization preamble;
b) generating the first synchronization preamble at least in part on a basis of the determined second location of the second synchronization preamble;
c) inserting the first synchronization preamble at the determined first location within the signal frame;
d) inserting the second synchronization preamble at the determined second location within the signal frame;
e) causing the signal frame to be issued towards a receiving device in a wireless communication environment.

24. The method as defined in claim 23, wherein determining the first location within the signal frame and the second location within the signal frame is done at least in part on a basis of frame length and channel conditions.

25. The method as defined in claim 23, wherein the signal frame is a frame of an Orthogonal Frequency Division Multiplexing (OFDM) signal.

26. The method as defined in claim 23, wherein generating the first synchronization sequence comprises generating a first synchronization sequence that conveys information indicative of the second location of the second synchronization preamble.

27. The method as defined in claim 23, wherein the method further comprises generating the second synchronization preamble, wherein generating the first synchronization preamble and the second synchronization preamble comprises causing at least one of the first synchronization preamble and second synchronization preamble to convey control information.

28. A method of receiving a signal frame in a wireless communication environment, the method comprising:
a) receiving a wireless signal comprising a plurality of signal frames, each signal frame comprising a first synchronization preamble and a second synchronization preamble;
b) identifying a first synchronization preamble within a given signal frame;
c) determining at least in part on a basis of information conveyed by the first synchronization preamble, a location within the given signal frame of the second synchronization preamble;
d) obtaining from a combination of the first synchronization preamble and the second synchronization preamble transmission signalling information.

29. The method as defined in claim 28, wherein the signal frame is a frame of an Orthogonal Frequency Division Multiplexing (OFDM) signal.

30. The method as defined in claim 28, wherein the information conveyed by the first synchronization preamble is carried via a first synchronization sequence.

31. A receiving device for receiving a signal frame in a wireless communication environment, the receiving device comprising:
a) receiving circuitry for receiving a wireless signal comprising a plurality of signal frames, each signal frame comprising a first synchronization preamble and a second synchronization preamble;
b) a control entity for:
i) identifying the first synchronization preamble within a given signal frame of the wireless signal;

ii) identifying, at least in part on a basis of information conveyed by the first synchronization preamble, the second synchronization preamble within the given signal frame;
iii) obtaining from at least one of the first synchronization preamble and the second synchronization preamble control information.

\* \* \* \* \*